United States Patent
Joong et al.

[11] Patent Number: 6,134,433
[45] Date of Patent: Oct. 17, 2000

[54] SYSTEM AND METHOD OF FORWARDING DATA CALLS IN A RADIO TELECOMMUNICATIONS NETWORK

[75] Inventors: Donald Joong, Montreal; Alan Sicher, Westmount; Michel Houde, St-Laurent, all of Canada

[73] Assignee: Telefonaktiebolaget L M Ericsson (publ), Stockholm, Sweden

[21] Appl. No.: 08/869,713

[22] Filed: Jun. 5, 1997

Related U.S. Application Data

[60] Provisional application No. 60/032,133, Dec. 9, 1996.

[51] Int. Cl.[7] .......................... H04M 3/42; H04M 11/00; H04Q 7/20
[52] U.S. Cl. .......................... 455/417; 455/414; 455/459; 379/210; 379/211; 379/93.09
[58] Field of Search .................................. 455/414, 417, 455/433, 550; 379/210, 211, 93.01, 93.09, 93.14

[56] References Cited

U.S. PATENT DOCUMENTS

| | | | |
|---|---|---|---|
| 5,033,079 | 7/1991 | Catron et al. | 379/93.14 |
| 5,203,014 | 4/1993 | Wagai et al. | 455/38.2 |
| 5,329,578 | 7/1994 | Brennan et al. | 455/414 |
| 5,375,161 | 12/1994 | Fuller et al. | 455/417 |
| 5,416,834 | 5/1995 | Bales et al. | 379/211 |
| 5,428,663 | 6/1995 | Grimes et al. | 379/57 |
| 5,448,626 | 9/1995 | Kajiya et al. | 379/67 |
| 5,457,732 | 10/1995 | Goldberg | 455/414 |
| 5,533,019 | 7/1996 | Jayapalan | 370/60.1 |
| 5,579,375 | 11/1996 | Ginter | 455/433 |
| 5,642,396 | 6/1997 | Cowgill | 379/14 |
| 5,742,905 | 4/1998 | Pepe et al. | 455/461 |
| 5,793,859 | 8/1998 | Matthews | 455/417 |
| 5,796,790 | 8/1998 | Brunner | 455/433 |
| 5,872,926 | 2/1999 | Levac et al. | 455/417 |

FOREIGN PATENT DOCUMENTS

| | | |
|---|---|---|
| 0714214A2 | 5/1996 | European Pat. Off. |
| 2244409A | 11/1991 | United Kingdom. |
| WO 95/31076 | 11/1995 | WIPO. |

*Primary Examiner*—Dwayne D. Bost
*Assistant Examiner*—Raymond B. Persino
*Attorney, Agent, or Firm*—Smith & Danamraj, P.C.

[57] ABSTRACT

In a radio telecommunications network, a system and method of providing service differentiation for call forwarding based upon the type of call. The system provides network support that allows the forwarding of calls of different types to appropriate devices for each type of call, as identified by the call's service code. The system determines whether a call to a mobile station is a data call, and if it is a data call, provides the network support for forwarding the call to a different number than voice calls. A Service Type parameter is added to ANSI-41 signaling messages to inform various nodes in the network of the type of call. The network includes a home location register/service control point (HLR/SCP) with a database of call forwarding (transfer) numbers for its served mobile stations. The database records at least one transfer number for each type of service. Service logic in the HLR/SCP associates the type of call with the appropriate transfer number. In this manner, incoming data calls such as G3Fax calls are forwarded to an alternate fax machine, a fax mailbox, or some other device capable of storing the data rather than a voice mailbox. The system and method are applicable to forwarding any type of data service, and are not limited to ADS and G3 Fax calls.

7 Claims, 9 Drawing Sheets

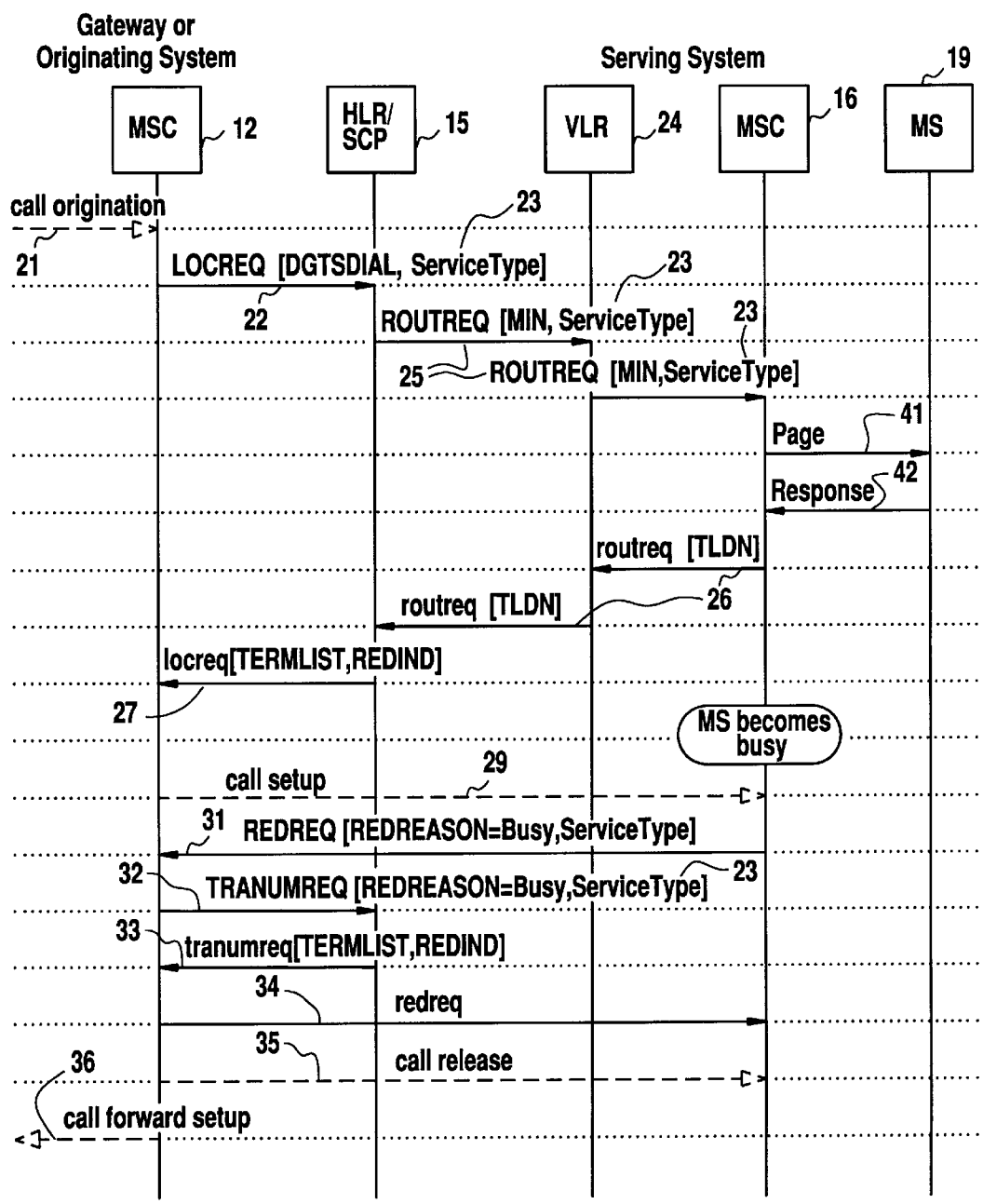

FIG. 4

| RedirectionRequest INVOKE Parameters | | | | Timer: RDRT |
|---|---|---|---|---|
| Field | Value | Type | Reference | Notes |
| Identifier | SET[UNIVERSAL 17] | M | 6.4.1.2 | |
| Length | variable octets | M | 6.4.1.1 | |
| Contents | | | | |
| BillingID (Originating) | | M | 6.5.2.16 | |
| ElectronicSerialNumber | | M | 6.5.2.63 | |
| MobileIdentificationNumber | | M | 6.5.2.81 | |
| RedirectionReason | | M | 6.5.2.110 | |
| CDMAServiceOption | | O | | c |
| LegInformation | | O | 6.5.2.75 | a |
| MSCIdentificationNumber | | O | 6.5.2.83 | b |
| TDMAServiceCode | | O | | d |

23a → CDMAServiceOption
23b → TDMAServiceCode

FIG. 5

| TransferToNumberRequest INVOKE Parameters | | | | Timer: TTNRT |
|---|---|---|---|---|
| Field | Value | Type | Reference | Notes |
| Identifier | SET[UNIVERSAL 17] | M | 6.4.1.2 | |
| Length | variable octets | M | 6.4.1.1 | |
| Contents | | | | |
| ElectronicSerialNumber | | M | 6.5.2.63 | |
| MobileIdentificationNumber | | M | 6.5.2.81 | |
| RedirectionReason | | M | 6.5.2.110 | |
| SystemMyTypeCode (MSC) | | M | 6.5.2.147 | |
| BillingID (Originating) | | O | 6.5.2.16 | a |
| CDMAServiceOption | | O | | f |
| GroupInformation | | O | 6.5.2.69 | b |
| LegInformation | | O | 6.5.2.75 | c |
| MSCIdentificationNumber | | O | 6.5.2.83 | d |
| PilotBillingID | | O | 6.5.2.94 | e |
| PilotNumber | | O | 6.5.2.95 | e |
| TDMAServiceCode | | O | | g |
| TransactionCapability | | O | 6.5.2.160 | d |

23a → CDMAServiceOption
23b → TDMAServiceCode

FIG. 6

| RedirectionDirective | INVOKE Parameters | | Timer: RDT | |
|---|---|---|---|---|
| Field | Value | Type | Reference | Notes |
| Identifier | SET[UNIVERSAL 17] | M | 6.4.1.2 | |
| Length | variable octets | M | 6.4.1.1 | |
| Contents | | | | |
| BillingID (Originating) | | M | 6.5.2.16 | |
| Digits (Destination) | | M | 6.5.2.58 | |
| ElectronicSerialNumber | | M | 6.5.2.63 | |
| MobileIdentificationNumber | | M | 6.5.2.81 | |
| SystemMyTypeCode (MSC) | | M | 6.5.2.147 | |
| CDMAServiceOption | | O | | f |
| Digits (Carrier) | | O | 6.5.2.58 | a |
| DMH_AccountCodeDigits | | O | 6.5.2.59 | b |
| DMH_AlternateBillingDigits | | O | 6.5.2.60 | b |
| DMH_BillingDigits | | O | 6.5.2.61 | b |
| MSCIdentificationNumber | | O | 6.5.2.83 | c |
| RedirectingNumberString | | O | 6.5.2.108 | d |
| RedirectingSubaddress | | O | 6.5.2.109 | d |
| SenderIdentificationNumber | | O | 6.5.2.116 | e |
| TDMAServiceCode | | O | | g |

23a → CDMAServiceOption
23b → TDMAServiceCode

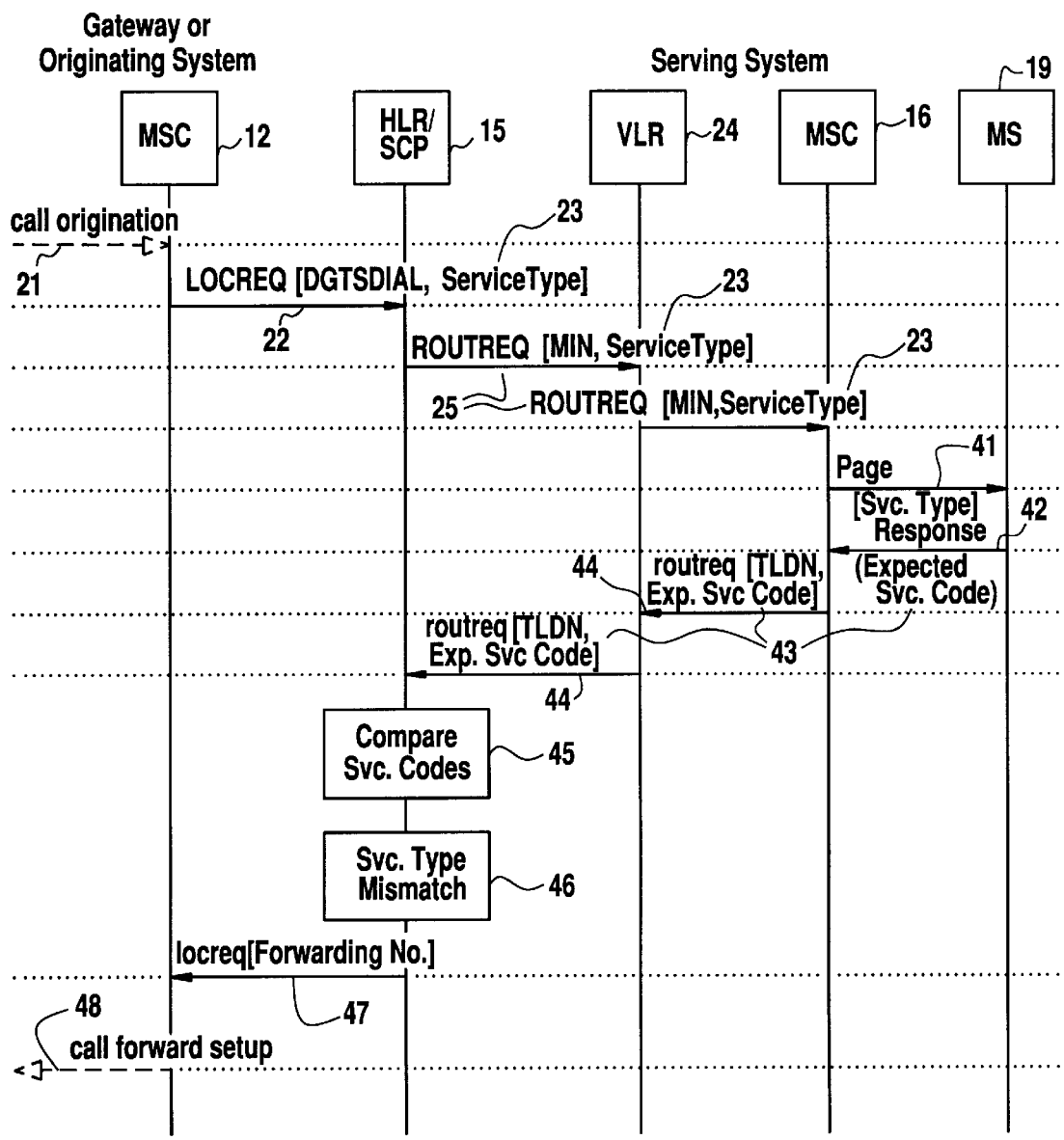

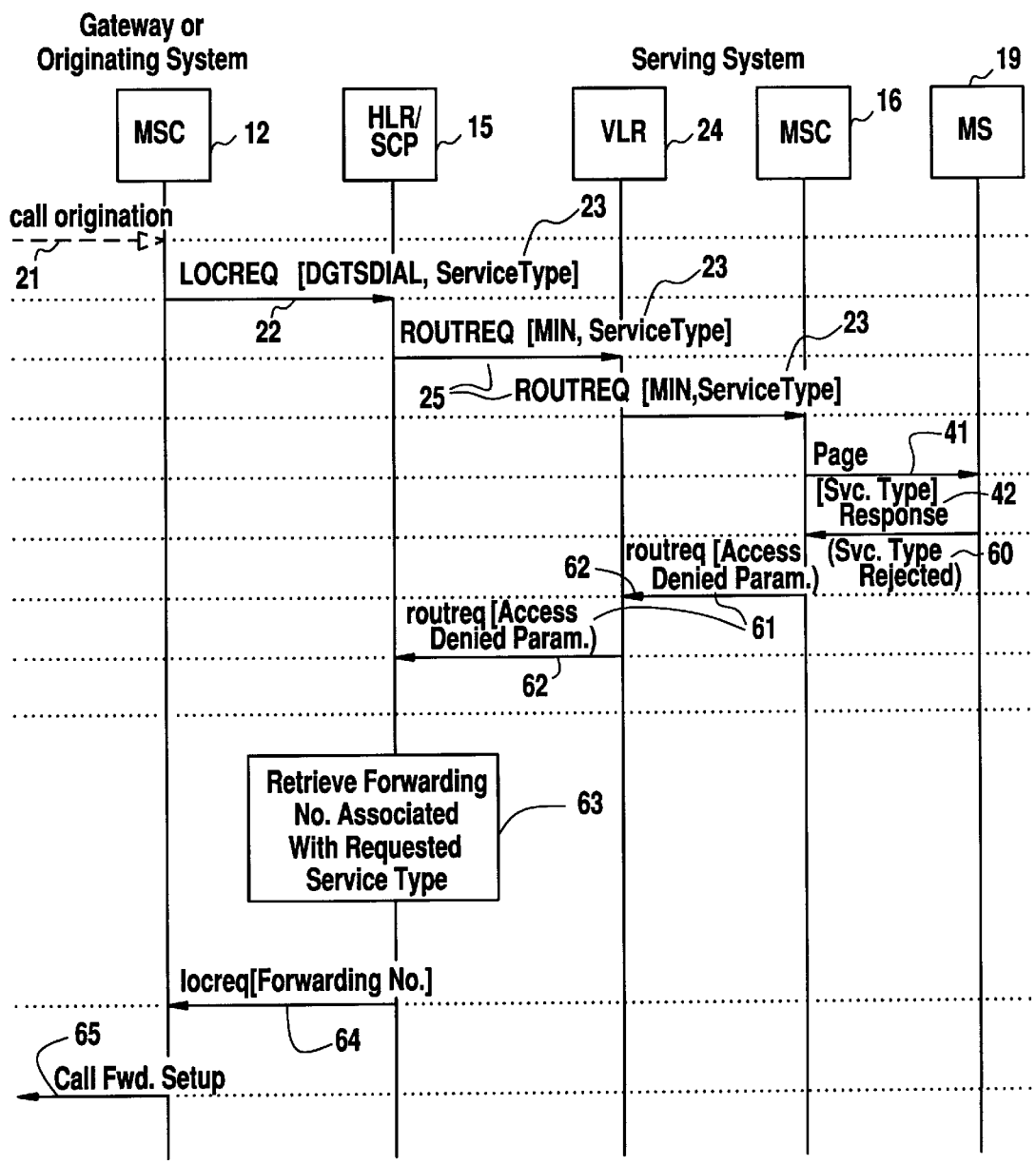

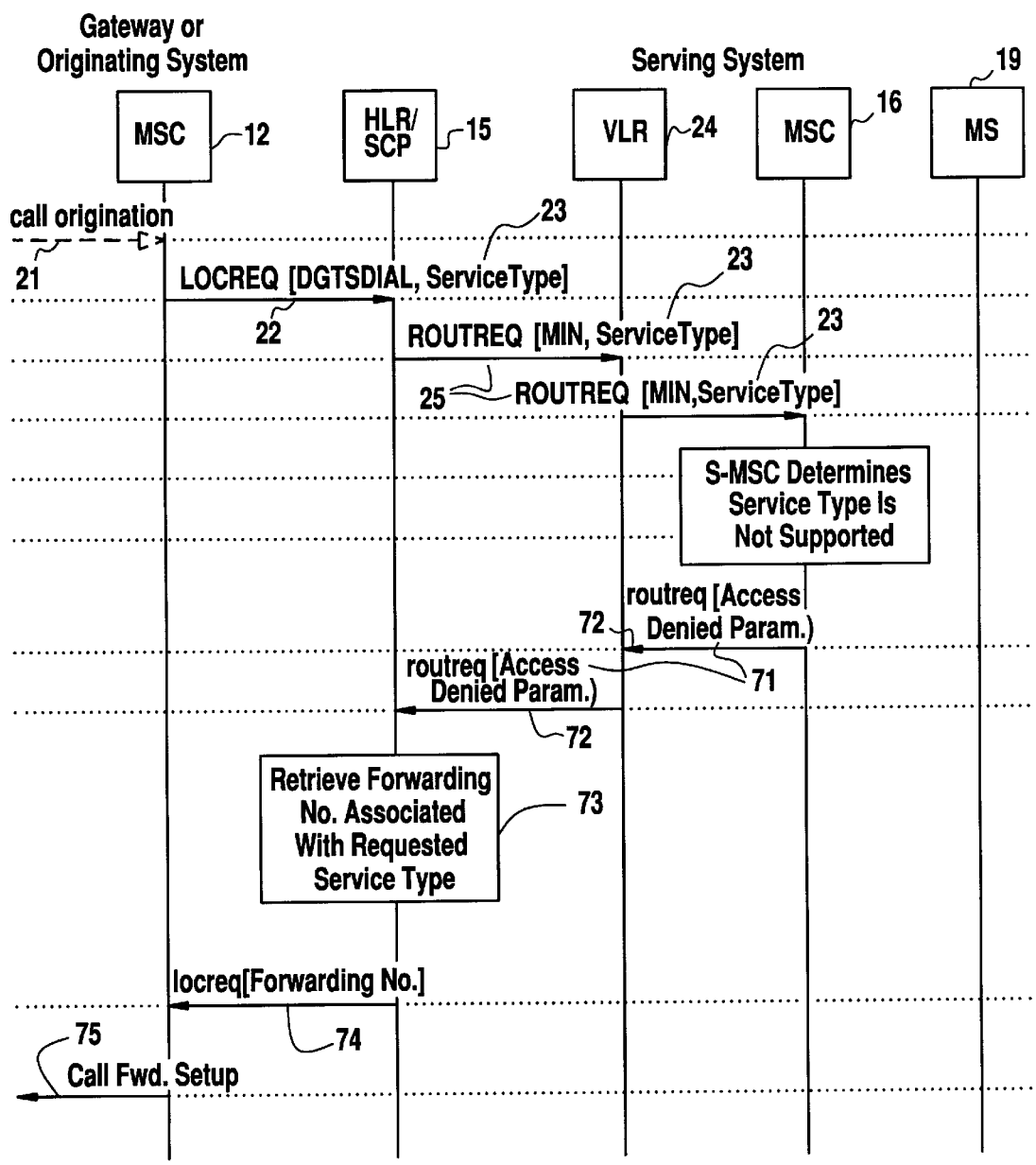

SYSTEM AND METHOD OF FORWARDING DATA CALLS IN A RADIO TELECOMMUNICATIONS NETWORK

PRIORITY STATEMENT UNDER 35 U.S.C. § 119(e) & 37 C.F.R § 1.78

This nonprovisional application claims priority based upon the prior U.S. provisional patent application entitled, "System and Method of Transferring Data Calls in a Radio Telecommunications Network", application Ser. No. 60/032,133, filed Dec. 9, 1996, in the names of Donald Joong, Alan Sicher, and Michel Houde.

BACKGROUND OF THE INVENTION

Technical Field of the Invention

This invention relates to radio telecommunication systems and, more particularly, to a system and method of forwarding data calls in a radio telecommunications network.

Description of Related Art

Existing radio telecommunications networks offer subscribers a supplementary service called call forwarding which allows a terminating call to be rerouted to an alternate destination. Within the context of mobile telephony, call forwarding is supported by storing a set of transfer numbers in the subscriber's home location register (HLR). When call forwarding is required, a transfer number is retrieved from the HLR and utilized to reroute the call.

There are three scenarios for call forwarding. The first is a transfer resulting from routing interrogation. During the routing interrogation process, an originating/gateway mobile switching center (O-MSC) interrogates the called subscriber's HLR to determine the location of the called mobile station. If the subscriber has the feature Call Transfer Immediate activated, the HLR determines that the call should be immediately transferred. The HLR then returns an appropriate transfer number to the O-MSC. The O-MSC then takes the appropriate actions to deliver the call to the transfer number.

The second scenario is a transfer at the O-MSC after the call is routed and there is no reply (no answer) from the called mobile station. After a successful routing interrogation process, the call is routed (trunked) from the O-MSC to the serving/visited MSC (V-MSC). If the subscriber does not answer the phone, the V-MSC may then initiate a Redirection Request back to the O-MSC. Upon receiving the redirection Request, the O-MSC initiates a transfer number Interrogation Request to the HLR. Upon receiving a transfer number Interrogation Request, the HLR returns an appropriate transfer number to the O-MSC. The O-MSC then takes the appropriate actions to deliver the call to the transfer number.

The third scenario is a transfer at the V-MSC after the call is routed and there is no reply (no answer or busy) from the called mobile station. In some circumstances, if a call is routed from the O-MSC to the V-MSC, and the subscriber is busy or does not answer the phone, the V-MSC may be prohibited from initiating a Redirection Request towards the O-MSC. In tis situation, the V-MSC must initiate the transfer number Interrogation Request to the HLR. Upon receiving the transfer number Interrogation Request, the HLR returns an appropriate transfer number to the V-MSC. The V-MSC then takes the appropriate actions to deliver the call to the transfer number.

Project Number 3770 (PN3770) describes the implementation of asynchronous data service (ADS) and facsimile (G3Fax) in mobile telephony. PN3770 details changes to ANSI-41 messages for network support of ADS and G3Fax calls in the cellular network. Without the present invention, however, PN3770 does not provide for network support for call forwarding of data calls. Therefore, the existing mechanism for handling call forwarding is not sufficient to provide a meaningful and useful service. This is because the existing mechanism, prior to the present invention, does not differentiate between a data call and a voice call. Therefore, when a data call such as a Fax call comes in today, and the subscriber is busy or has immediate call transfer activated, the data call is transferred to the same number to which voice calls are transferred. If voice calls are being transferred to voice mail, then a data call is also transferred to voice mail.

Although there are no known prior art teachings of a solution to the aforementioned deficiency and shortcoming such as that disclosed herein, U.S. Pat. No. 5,533,019 to Jayapalan (Jayapalan) and U.S. Pat. No. 5,416,834 to Bales et al. (Bales) discuss subject matter that bears some relation to matters discussed herein. Jayapalan discloses a method and apparatus for communicating packet data calls over a radio channel. However, Jayapalan does not teach or suggest a method of forwarding data calls in a radio telecommunications network.

Bales discloses a telecommunication protocol message for a landline telephone system that allows redirection of a call received by a first telephone station to a second telephone station or terminal. The redirect message gives a basic rate interface (BRI) station set the capability of automatically forwarding certain types of calls. The BRI set can be programmed to examine the bearer capability information element in the setup message to determine the type of call being set up. If the call is a data call, the BRI set is programmed to transfer the call to an appropriate terminal.

The method disclosed in Bales, however, is only applicable to landline systems with intelligent, programmable BRI station sets. Bales does not in any way teach or suggest a method of forwarding data calls to different transfer numbers than voice calls in a radio telecommunications network.

Review of each of the foregoing references reveals no disclosure or suggestion of a system or method such as that described and claimed herein.

In order to overcome the disadvantage of existing solutions, it would be advantageous to have a system and method in a radio telecommunications network that passes a call's service type to the network's service logic so that it can make a more intelligent decision regarding which transfer number to return. Such a system would transfer ADS, G3Fax, and other data calls differently than their voice calls. The present invention provides changes to ANSI-41 messages to provide network support for intelligent call forwarding of data calls.

SUMMARY OF THE INVENTION

The present invention is a system and method of providing service differentiation for call forwarding based upon the type of call. The present invention provides network support that allows the forwarding of calls of different types to appropriate devices for each type of call, as identified by the call's service code. For example, the present invention determines whether the call is a data call, and if it is a data call, the present invention provides the network support for forwarding the call to a different number than voice calls. For example, an incoming call identified as a G3Fax call is transferred to an alternate fax machine or a fax mailbox, or some other device capable of storing the data rather than a voice mailbox. The present invention is applicable to forwarding any type of service other than voice, and is not limited to ADS and G3 Fax calls.

Thus, in one aspect, the present invention is a system in a radio telecommunications network for forwarding a voice call to a first transfer number and forwarding a data call to a second transfer number. The system includes means for determining whether an incoming call from a calling party for a mobile station is a data call, and means for determining whether the mobile station is available to take the call. The system also includes means for forwarding the incoming call to the first transfer number upon determining that the incoming call is not a data call, and the mobile station is not available to take the call. The system also includes means for forwarding the incoming call to the second transfer number upon determining that the incoming call is a data call, and the mobile station is not available or is currently not capable of taking the call, or the network cannot service the call.

In another aspect, the present invention is a method in a radio telecommunications network of forwarding a voice call to a first transfer number and forwarding a data call to a second transfer number. The method begins by determining whether an incoming call from a calling party for a mobile station is a data call, determining whether the mobile station is available to take the call, and forwarding the incoming call to the first transfer number upon determining that the incoming call is not a data call, and the mobile station is not available to take the call. The method also includes the step of forwarding the incoming call to the second transfer number upon determining that the incoming call is a data call, and the mobile station is not available to take the call.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 3 is a message flow diagram illustrating the flow of messages in the present invention when forwarding a data call due to the called mobile station becoming busy at the serving mobile switching center before call setup;

FIG. 4 is a table of parameters for the Redirection Request (REDREQ) Invoke message illustrating the addition of a CDMA Service Option parameter and a TDMA Service Code parameter according to the teachings of the present invention;

FIG. 5 is a table of parameters for the Transfer to No. Request (TRANUMREQ) Invoke message illustrating the addition of the CDMA Service Option parameter and the TDMA Service Code parameter according to the teachings of the present invention; and FIG. 6 is a table of parameters for the Redirection Directive (REDDIR) Invoke message illustrating the addition of the CDMA Service Option parameter and the TDMA Service Code parameter according to the teachings of the present invention;

FIG. 7 is a message flow diagram illustrating the flow of messages in the present invention when forwarding a call due to a service type mismatch at the HLR/SCP between the service requested by the calling party and the service requested by the called mobile station;

FIG. 9 is a message flow diagram illustrating the flow of messages in the present invention when forwarding a call due to a service type rejection by the called mobile station; and FIG. 10 is a message flow diagram illustrating the flow of messages in the present invention when forwarding a call due to a service type rejection by the serving MSC.

DETAILED DESCRIPTION OF EMBODIMENTS

Figure 1:
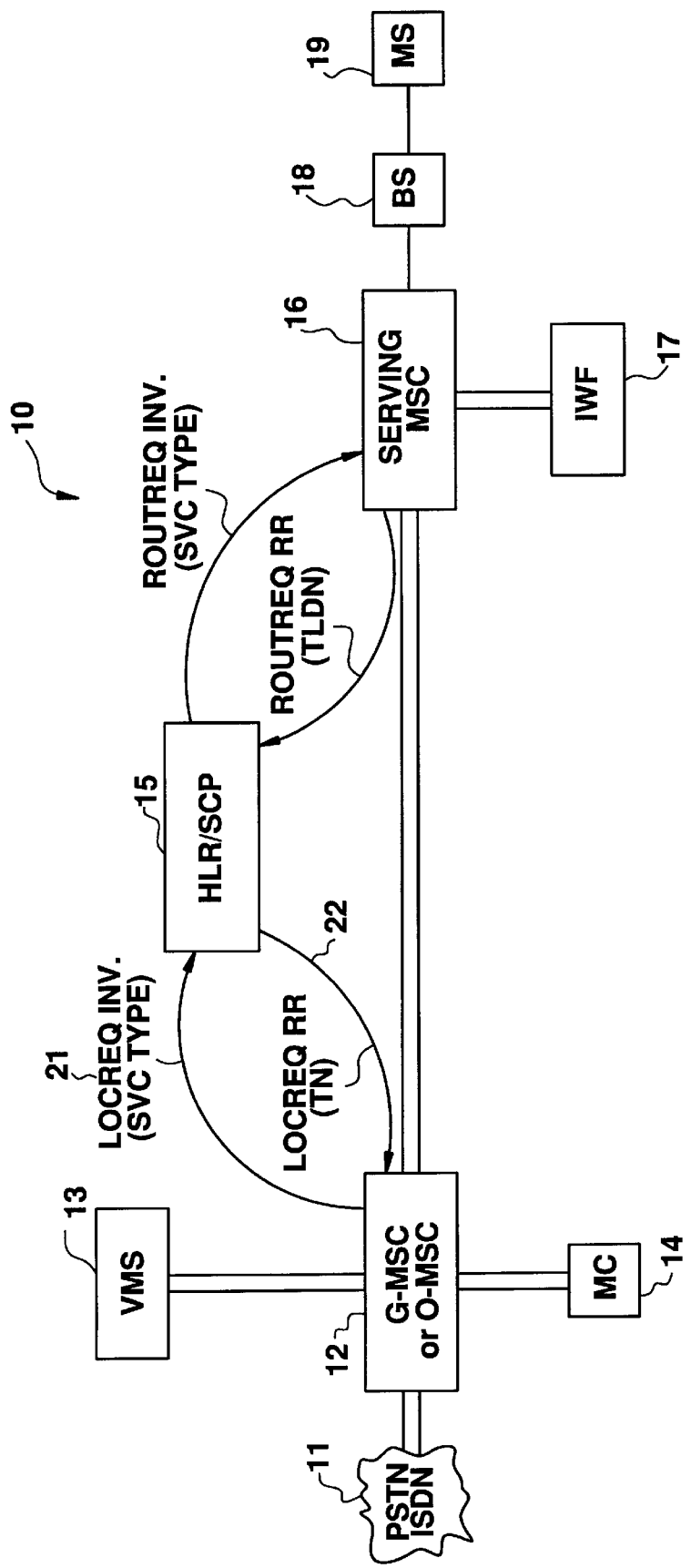
FIG. 1 is a block diagram of a radio telecommunications network in which the call forwarding support system of the present invention has been implemented.

FIG. 1 is a block diagram of a radio telecommunications network in which the call forwarding support system of the present invention has been implemented. Landline networks 11 such as the Public Switched Telephone Network (PSTN) or the Integrated Services Digital Network (ISDN) are connected to the radio telecommunications network 10 through a gateway mobile switching center (G-MSC). The G-MSC may also be an Originating MSC (O-MSC) 12 if the incoming call is a mobile originated call rather than coming from a landline network such as the PSTN. The O-MSC may be connected to peripheral equipment and other network nodes such as a voice mail system (VMS) 13 and a data message center (MC) 14 which may be a multimedia-capable message center or a fax mailbox, etc. Thus, a subscriber may have the VMS 13 for storing voice calls, and may also have a device for storing and forwarding fax messages or a multimedia message center that allows for the transfer of files, etc. The present invention enables the subscriber to divert various data calls to the appropriate storage device. The O-MSC may also be connected to other switching nodes, enabling the forwarding of calls to other network routable numbers.

The G-MSC or O-MSC 12 is connected via ANSI-41 signaling links to a home location register (HLR) 15 which includes service logic and a database of subscriber information. In some networks which incorporate intelligent network services, the HLR may be combined with a service control point (SCP) which stores the service logic for implementing intelligent network services. Thus, in these networks, the location of the called mobile station, or the transfer number may be obtained from a node referred to as the HLR/SCP or simply "service logic."

The HLR/SCP is connected via ANSI-41 signaling links to a serving MSC 16. The serving MSC has an interworking function (IWF) 17 associated with it for interfacing landline data protocols with digital cellular radio protocols. The serving MSC is connected to one or more base stations (13S) 18 which transmit and receive information with one or more mobile stations (MS) 19. The exact network architecture may vary from one manufacturer to another, and not affect the scope of the present invention. For example, in some network architectures, the VMS 13 is connected to the serving MSC 16.

The IWF 17 is logically connected to the call to provide interworking between the mobile-specific protocols utilized on the air interface and the landline-specific protocol utilized with data/fax transmissions. For example, the IS-136 air interface standard defines how data transmitted to and from a mobile station is formatted into Time Division Multiple Access (TDMA) bursts. When a data call is received at the serving MSC 16, the data is sent to the IWF 17 where it is placed in the TDMA format for transmission to the mobile station 19. Functions performed in the IWF include rate adaptation between the transmission rate over the air interface and the transmission rate over the land lines. Thus, the IWF performs flow control, error control, data buffering, encryption, compression, etc.

Although the preferred embodiment of the present invention is described herein in terms of IS-136 Time Division Multiple Access (TDMA) systems, the present invention is a network-level invention which is applicable to Code Division Multiple Access (CDMA) systems, the Global System for Mobile Communications (GSM), or any other type of air interface system such as the analog Narrow-band Advanced Mobile Phone System (NAMPS). Applicable standards, which are hereby incorporated by reference include the IS-130 link layer standard, the IS135 standard for computer-to-modem commands, the IS-136 TDMA standard for low level framing and bit formatting of the radio channel, the IS-95 and IS-99 standards for CDMA, and the standard for GSM.

Normally when a call to a mobile station comes in from the PSTN 11, it is trunked to the O-MSC 12. The O-MSC interrogates the HLR/SCP 15 for the location of the called mobile station 19. The HLR/SCP interrogates the serving MSC 16 for routing instructions. The serving MSC returns a routing number through the HLR/SCP to the O-MSC The call is then trunked from the O-MSC 12 to the serving MSC 16 and connected to the called mobile station 19 through the serving base station 18.

This scenario changes when the call must be transferred to a transfer number. This can occur under various circumstances. For example, the called subscriber may have activated the immediate call transfer feature. In this situation, the call is routed to the O-MSC 12 which interrogates the HLR/SCP 15 for the location of the called mobile station 19. If the subscriber has immediate call transfer activated, the HLR/SCP 15 finds a transfer number in its subscriber database and returns the transfer number to the O-MSC. The call is then routed to the transfer number without setting up the call to the serving MSC. In PN3770, no differentiation is made between data calls and voice calls.

In order to provide a meaningful and useful transfer service for ADS/G3Fax calls, a separate set of transfer numbers is defined in the HLR/SCP 15 for ADS/G3Fax calls. During the routing interrogation process, the HLR/SCP is informed that the call is an ADS/G3Fax call. Upon determining that the ADS/G3Fax call can not be delivered, the HLR/SCP 15 returns an appropriate ADS/G3Fax transfer number to the O-MSC 12.

The present invention requires that the type of call be identified to the HLR/SCP 15. This may be accomplished in several ways. First, the calling party may perform a two-stage dialing procedure. Different pilot numbers are utilized to identify different types of calls. For example, there is a different pilot number for ADS and for G3Fax calls. If the calling party first dials the pilot number for a G3Fax call, the pilot number directs the call to the O-MSC 12 and identifies the type of call as a G3Fax call. The O-MSC recognizes the number as a pilot number for a G3 Fax call, and sends another dial tone requesting the calling party to enter a second number. The second number is the subscriber number for the called mobile station 19. The O-MSC then includes an indication of the type of call in a Location Request (LOCREQ) Invoke message 21 sent to the HLR/SCP 15. At that point, the HLR/SCP knows that immediate call transfer is activated, and the type of call is a G3Fax call. Therefore, the HLR/SCP returns a LOCREQ Return Result message 22 to the O-MSC and includes a transfer number (TN) 22 for G3Fax calls.

The type of call may also be identified by assigning different numbers to the called mobile station, depending on the type of call to be made. For example, a first number may be utilized for voice calls to the mobile station while a second number is for data calls to the mobile station. When one of these numbers is dialed by a calling party, the call is routed to the O-MS C 12. The O-MS C does not know what type of call it is, and interrogates the HLR/SCP 15 for location information. The HLR/ISCP then associates the dialed number with a type of call and handles the call accordingly.

Other methods of identifying the type of call also exist. For example, the type of call may be identified directly from the ISDN User Part, User Service Information (USI) field which is mapped from the Bearer Capability Indicator (BCI) provided by the calling party. If the USI field is received, then the O-MSC 12 can deduce that the call is a data call and handle the call accordingly.

If the serving MSC 16 or O-MSC 12 have to request a transfer number to forward an ADS/G3Fax call, the Transfer to Number Request Invoke message may include the service code parameter to indicate that this transfer service is being requested for an ADS/G3Fax call.

If a Redirection Request Invoke message (ANSI-41) is sent from the serving MSC 16 back to the O-MSC 12, it may also include a service code parameter to indicate that this transfer service is being requested for an ADS/G3Fax call.

Commands and procedures are implemented at the HLR/SCP to properly administer the new transfer numbers. The system is implemented to allow the HLR/SCP to store and retrieve one transfer number per Service Code or service. Procedures are also defined so that subscribers can change the transfer numbers.

Figure 2:
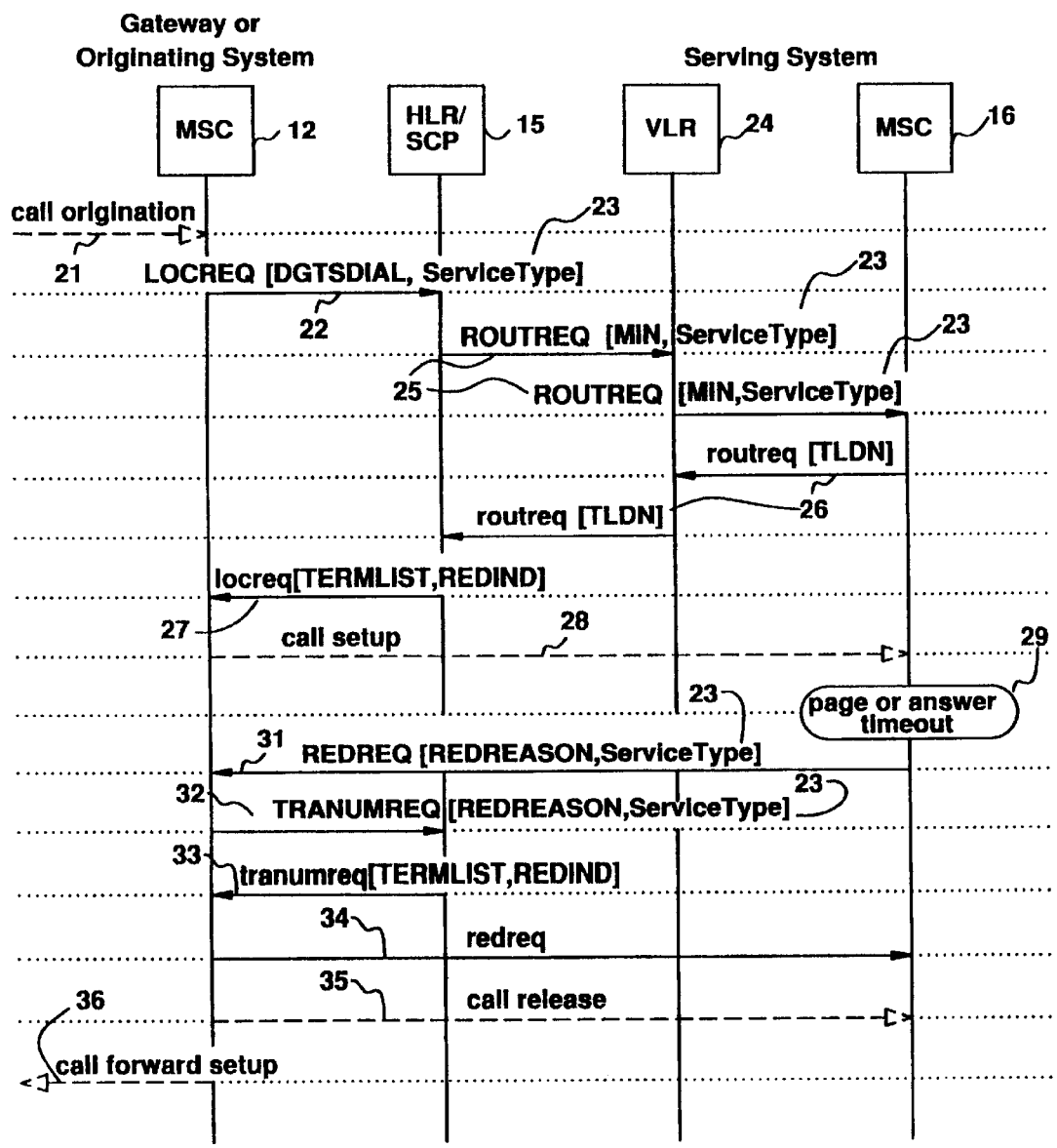
FIG. 2 is a message flow diagram illustrating the flow of messages in the present invention when forwarding a data call due to a page or answer timeout at the serving mobile switching center following call setup.

FIG. 2 is a message flow diagram illustrating the flow of messages in the present invention when forwarding a data call due to a page or answer timeout at the serving mobile switching center following call setup. Referring to FIGS. 1 and 2, a call origination 21 is received at the originating (gateway) O-MSC 12. The O-MSC then sends a Location Request (LOCREQ) Invoke message 22 to the HLR/SCP 15 requesting location information for the called mobile station 19. When the O-MSC 12 knows the type of call because, for example, the calling party utilized two-stage dialing, a Service Type parameter 23 is included in the LOCREQ Invoke message to the HLR/SCP. The Service Type parameter is passed on to the visitor location register (VLR) 24 and the serving MSC 16 (collectively, the serving system) in a Routing Request (ROUTREQ) Invoke message 25.

The serving MSC 16 returns a routing number such as a Temporary Location Directory No. (TLDN) to the VLR 24 and the HLR/SCP 15 in a ROUTREQ Return Result message 26. The HLR/SCP then returns the location information to the O-MSC 12 in a LOCREQ Return Result message 27. The O-MSC 12 then sets up the call at 28 directly to the serving MSC 16.

The serving MSC 16 then pages for the called mobile station 19. If there is no page response from the mobile station, or if the mobile station responds to the page, but the subscriber does not answer the call at 29, then the call must be redirected. Therefore, the serving MSC 16 sends a Redirection Request (REDREQ) Invoke message 31 to the originating MSC 12. If the service type has been identified by a method such as one-number-per-service, where the service type is identified in the HLR/SCP 15 after the LOCREQ Invoke message 22 is sent, then the originating MSC does not know the service type. In this instance, the serving MSC 16 includes the Service Type parameter 23 in the REDREQ Invoke message 31. If the service type is identified by two-stage dialing or by an incoming ISUP message, then the originating MSC 12 might know the service type, and the Service Type parameter may be omitted from the REDREQ Invoke message. In the preferred embodiment of the present invention, the Service Type parameter 23 is passed back to the originating MSC even if two-stage dialing was utilized, and the originating MSC knew the type of call when the LOCREQ Invoke message 22 was sent. This embodiment eliminates the requirement to store large quantities of state information in the originating MSC 12 for all calls, just to support the rare instances when data calls do not connect through, and have to be transferred. In addition, there may also be service changes during the call which require that a new Service Type parameter be sent to the originating MSC.

The originating MSC 12 then sends a Transfer to Number Request (TRANUMREQ) Invoke message 32 to the HLR/SCP 15 and may include the Service Type parameter 23. Alternatively, the originating MSC may include a Billing ID parameter in the TRANUMREQ Invoke message which enables the HLR/SCP to identify the call from the previous signaling messages, and thereby identify the type of call. The HLR/SCP 15 then selects the transfer number associated with the identified type of call, and returns the number to the O-MSC 12 in a TRANUMREQ Return Result message 33. The O-MSC then sends a REDREQ Return Result message 34 to the serving MSC 16, and then releases the call to the serving MSC at 35. At 36, the O-MSC sets up the call to the transfer number.

If there is a Local Access and Transport Area (LATA) boundary between the originating MSC 12 and the serving MSC 16, then the serving MSC may send the TRANUMREQ Invoke message to the HLR/SCP 15 rather than the originating MSC sending the message.

FIG. 3 is a message flow diagram illustrating the flow of messages in the present invention when forwarding a data call due to the called mobile station becoming busy at the serving mobile switching center before call setup. In situations where the originating MSC 12 and the serving MSC 16 are in the same LATA, some telecommunication systems page for the called mobile station at 41 when the ROUTREQ Invoke message 25 is received at the serving MSC. If a page response 42 is received at that time, the serving MSC 16 sends the ROUTREQ Return Result message 26 to the HLR/SCP 15. If the mobile station fails to respond to the page or becomes busy or otherwise unavailable after the routing messages are completed, but before call setup is completed, the serving MSC 16 sends the REDREQ Invoke message 31 to the originating MSC 12 and includes the Service Type parameter 23. The remainder of the message flow is identical to that described in FIG. 2.

FIG. 4 is a table of parameters for the Redirection Request (REDREQ) Invoke message 31 illustrating the addition of the Service Type parameter 23 according to the teachings of the present invention. The parameter appears as CDMA Service Option 23*a* and TDMA Service Code 23*b*. It may also appear as any parameter of similar function for other air interfaces (e.g., NAMPS).

FIG. 5 is a table of parameters for the Transfer to No. Request (TRANUMREQ) Invoke message 32 illustrating the addition of the Service Type parameter 23 according to the teachings of the present invention. The parameter appears as CDMA Service Option 23*a* and TDMA Service Code 23*b*. It may also appear as any parameter of similar function for other air interfaces (e.g., NAMPS).

A data call may be first routed to an adjunct MSC. Then, based on service control logic, a Redirection Directive (REDDIR) Invoke message may be sent back to the O-MSC requesting the O-MSC to forward the data call to another network routable number. FIG. 6 is a table of parameters for the REDDIR Invoke message illustrating the addition of the Service Type parameter 23 according to the teachings of the present invention. The parameter appears as CDMA Service Option 23*a* and TDMA Service Code 23*b*. It may also appear as any parameter of similar function for other air interfaces (e.g., NAMPS).

Thus, in existing systems, the service logic performs transfers in a single way which always assumes the call is a voice call. The present invention passes the service type to the service logic so that it can make a more intelligent decision regarding which transfer number to return.

FIG. 7 is a message flow diagram illustrating the flow of messages in the present invention when forwarding a call due to a service type mismatch at the HLR/SCP 15 between the service requested by the calling party and the service requested by the called mobile station 19. In this embodiment of the present invention, the message flow is the same as in FIG. 3 until the serving MSC 16 sends a page 41 to the called mobile station, including the requested service type 23, and obtains a page response 42 with an expected service code 43 from the mobile station. The expected service code 43 indicates the type of call which the mobile station is expecting to receive, or is capable of receiving. The serving MSC then provides the expected service code 43 in a ROUTREQ Return Result message 44 to the HLR/SCP 15, indicating the expected service code that the mobile station provided in its page response. At 45, the HLR/SCP 15 then compares the expected service code 43 received in the ROUTREQ Return Result message 44 with the service code that the HLR/SCP 15 sent in the ROUTREQ Invoke message 25. At 46, the HLR/SCP 15 then validates whether the MS 19 has responded with the proper service code for the type of call being delivered.

For service type matching in the HLR/SCP 15, the present invention compares service types rather than specific service codes. This is done because there are, for example, several service codes corresponding to speech. For example, there are service codes identifying analog speech or digital speech, and analog or digital speech (analog preferred or digital preferred). There are also service codes for several types of data such as asynchronous data and G3 Fax. If a mobile station is paged for speech, and responds with one of the service codes pertaining to speech, then there is a match. If an expected service code of an entirely different type is received, then there is a mismatch.

If there is a service type mismatch at 46, the BLR/SCP 15 sends a LOCREQ Return Result message 47 to the O-MSC 12 and includes an appropriate forwarding number for the type of call that was originally requested in the LOCREQ Invoke message 22. The O-MSC 12 then sets up the call to the forwarding number at 48.

Figure 8:
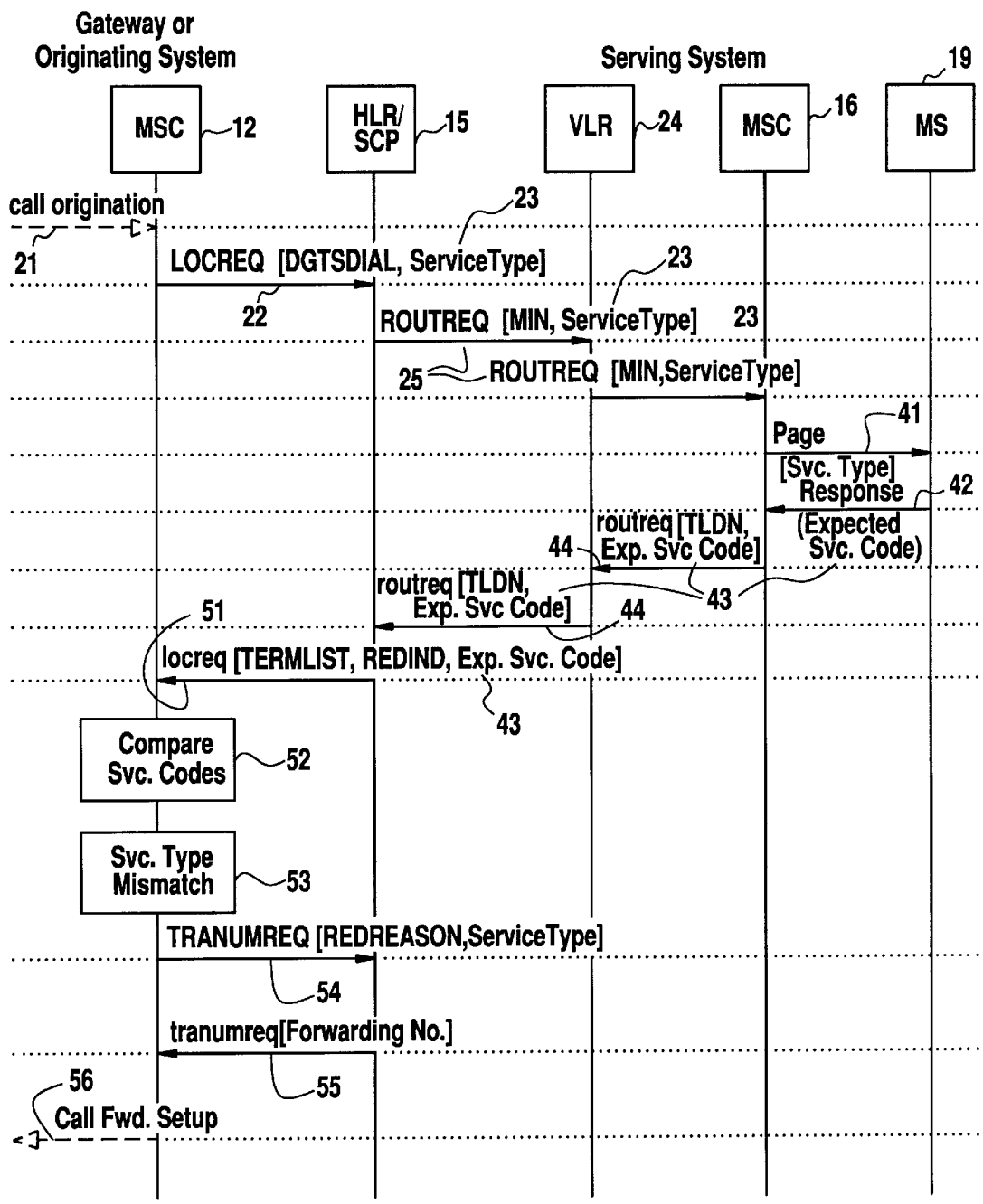
FIG. 8 is a message flow diagram illustrating the flow of messages in the present invention when forwarding a call due to a service type mismatch at the originating MSC between the service requested by the calling party and the service requested by the called mobile station.

FIG. 8 is a message flow diagram illustrating the flow of messages in the present invention when forwarding a call due to a service type mismatch at the originating MSC 12 between the service requested by the calling party and the service requested by the called mobile station 19. In this embodiment of the present invention, the message flow is the same as in FIG. 3 until the serving MSC 16 sends a page 41 to the called mobile station, including the requested service type 23, and obtains a page response 42 with an expected service code 43 from the mobile station. The serving MSC then provides the expected service code 43 in a ROUTREQ Return Result message 44 to the HLR/SCP 15. The HLR/SCP sends a LOCREQ Return Result message 51 to the O-MSC 12 and includes the expected service code 43, indicating the expected service code that the mobile station provided in its page response.

At 52, the O-MSC 12 then compares the expected service code 43 received in the LOCREQ Return Result message 51 with the service code that the O-MSC 12 sent in the LOCREQ Invoke message 22. At 53, the O-MSC 12 then validates whether the MS 19 has responded with the proper service code for the type of call being delivered.

If there is a service type mismatch at 53, the O-MSC 12 sends a TRANUMREQ Invoke message 54 to the HLR/SCP 15 and includes the service type that was originally requested in the LOCREQ Invoke message 22. The HLR/SCP 15 then sends a TRANUMREQ Return Result message 55 to the O-MSC 12 with an appropriate forwarding number for the requested type of call. The O-MSC 12 then sets up the call to the forwarding number at 56.

FIG. 9 is a message flow diagram illustrating the flow of messages in the present invention when forwarding a call due to a service type rejection by the called mobile station 19. In this embodiment of the present invention, the message flow is the same as in FIG. 3 until the serving MSC 16 sends a page 41 to the called mobile station, including the requested service type 23, and obtains a page response 42 with an indication that the mobile station 19 has rejected the requested service type. This may occur during a scenario in which a mobile subscriber utilizes his mobile station both as a telephone and, at other times, as a mobile terminal for fax/data calls. When the mobile station is connected, for example, to a personal computer (PC), the mobile station knows that it is then capable of receiving fax/data calls. If a page is received which includes a requested service type 23 for a data call, the mobile station responds and includes an expected service code for data calls. The call is then delivered. However, if the subscriber disconnects the mobile station from the PC so that the mobile station may be utilized as a telephone, the mobile station knows that it can no longer receive fax/data calls. If a page is received which includes a requested service type 23 for a data call, the mobile station responds and includes an indication 60 that the service type is rejected.

This scenario may also occur if the mobile station is connected to the PC, and a page is received which includes a requested service type 23 for a voice call. Since the mobile station knows that it is only capable of receiving fax/data calls at that time, it rejects the requested service type.

The serving MSC 16 then includes an Access Denied Parameter 61 service rejection by the mobile station in a ROUTREQ Return Result message 62 to the HLR/SCP 15. The serving MSC does not return a routing number (for example, a Temporary Location Directory Number (TLDN)) since the mobile station 19 has indicated that it is not capable of accepting the call. The HLR/SCP then accesses its database of forwarding numbers at 63, and selects a forwarding number which is associated with the requested service type 23 that was originally requested in the LOCREQ Invoke message 22. The HLR/SCP 15 then sends a LOCREQ Return Result message 64 to the O-MSC 12 and includes the appropriate forwarding number for the type of call. The O-MSC 12 then sets up the call to the forwarding number at 65.

FIG. 10 is a message flow diagram illustrating the flow of messages in the present invention when forwarding a call due to a service type rejection by the serving MSC 16. In this embodiment of the present invention, the message flow is the same as in FIG. 3 until the VLR 24 sends the ROUTREQ Invoke message 25 to the serving MSC 16, and includes the service type parameter 23. Upon receiving the ROUTREQ Invoke message, the serving MSC 16 determines whether it supports the request service type identified in the service type parameter 23. If so, the mobile station is paged, and the call is connected normally. If not, the serving MSC 16 does not page the mobile station, but includes an Access Denied Parameter 71 service rejection by the serving system in a ROUTREQ Return Result message 72 to the HLR/SCP 15. The serving MSC does not return a routing number (for example, a Temporary Location Directory No. (TLDN)) since the serving MSC is not capable of supporting the call. The HLR/SCP then accesses its database of forwarding numbers at 73, and selects a forwarding number which is associated with the requested service type 23 that was originally requested in the LOCREQ Invoke message 22. The HLR/SCP 15 then sends a LOCREQ Return Result message 74 to the O-MSC 12 and includes the appropriate forwarding number for the type of call. The O-MSC 12 then sets up the call to the forwarding number at 75.

It is thus believed that the operation and construction of the present invention will be apparent from the foregoing description. while the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network, a method of forwarding a first type of call to a first transfer number and forwarding a second type of call to a second transfer number, said network having an originating mobile switching center (O-MSC), a home location register/service control point (HLR/SCP), and a serving mobile switching center (serving MSC), said method comprising the steps of:

storing the first transfer number and the second transfer number in said HLR/SCP;

associating the first transfer number with a service code for the first type of call, and associating the second transfer number with a service code for the second type of call;

determining whether an incoming call from a calling party for a mobile station is said first type of call or said second type of call;

including a requested service code in a routing request invoke message sent from the HLR/SCP to the serving MSC, said requested service code indicating the type of call requested by the calling party;

obtaining an expected service code from said mobile station;

including said expected service code in a routing request return result message sent from said serving MSC to said HLR/SCP;

determining in said HLR/SCP, whether said expected service code matches said requested service code;

determining, in said HLR/SCP, a forwarding number associated with said requested service code;

sending, from said HLR/SCP to said O-MSC, the forwarding number associated with the requested service code, upon determining that said expected service code does not match said requested service code; and forwarding said incoming call to said forwarding number associated with the requested service code.

2. In a radio telecommunications network, a method of forwarding a first type of call to a first transfer number and forwarding a second type of call to a second transfer number, said network having an originating mobile switching center (O-MSC), a home location register/service control point (HLR/SCP), and a serving mobile switching center (serving MSC), said method comprising the steps of:

storing the first transfer number and the second transfer number in said HLR/SCP;

associating the first transfer number with a service code for the first type of call, and associating the second transfer number with a service code for the second type of call;

determining whether an incoming call from a calling party for a mobile station is said first type of call or said second type of call;

including a requested service code in a location request invoke message sent from the O-MSC to the HLRISCP, said requested service code indicating the type of call requested by the calling party;

obtaining an expected service code from said mobile station;

including said expected service code in a location request return result message sent from said HLR/SCP to said O-MSC;

determining in said O-MSC, whether said expected service code matches said requested service code;

requesting from said HLR/SCP, a forwarding number associated with said requested service code, upon determining that said expected service code does not match said requested service code;

determining, in said HLR/SCP, a forwarding number associated with said requested service code;

sending, from said HLR/SCP to said O-MSC, the forwarding number associated with the requested service code; and forwarding said incoming call to said forwarding number associated with the requested service code.

3. In a radio telecommunications network, a method of forwarding a first type of call to a first transfer number and forwarding a second type of call to a second transfer number, said network having an originating mobile switching center (O-MSC), a home location register/service control point (HLR/SCP), and a serving mobile switching center (serving MSC), said method comprising the steps of:

storing the first transfer number and the second transfer number in said HLR/SCP;

associating the first transfer number with a service code for the first type of call, and associating the second transfer number with a service code for the second type of call;

determining whether an incoming call from a calling party for a mobile station is said first type of call or said second type of call;

including a requested service code in a routing request invoke message sent from the HLR/SCP to the serving MSC, said requested service code indicating the type of call requested by the calling party;

sending a paging signal to said mobile station, said paging signal including said requested service code;

obtaining a page response from said mobile station, said page response including an indication that said requested service code is rejected;

including, in a routing request return result message sent from said serving MSC to said HLR/SCP, an Access Denied Parameter set to service rejected by the mobile station;

determining, in said HLR/SCP, a forwarding number associated with said requested service code;

sending, from said HLR/SCP to said O-MSC, the forwarding number associated with the requested service code; and forwarding said incoming call to said forwarding number associated with the requested service code.

4. The method of claim 3 further comprising the steps of:

receiving said paging signal in said mobile station;

analyzing said requested service code included in said paging signal;

determining whether said mobile station is currently able to accept the type of call associated with said requested service code; and including said indication that said requested service code is rejected in said page response, upon determining that said mobile station is currently not able to accept the type of call associated with said requested service code.

5. In a radio telecommunications network, a method of forwarding a first type of call to a first transfer number and forwarding a second type of call to a second transfer number, said network having an originating mobile switching center (O-MSC), a home location register/service control point (HLR/SCP), and a serving mobile switching center (serving MSC), said method comprising the steps of:

storing the first transfer number and the second transfer number in said HLR/SCP;

associating the first transfer number with a service code for the first type of call, and associating the second transfer number with a service code for the second type of call;

determining whether an incoming call from a calling party for a mobile station is said first type of call or said second type of call;

including a service type parameter in a routing request invoke message sent from the HLR/SCP to the serving MSC, said service type parameter indicating the type of call requested by the calling party;

determining in said serving MSC whether the type of call requested by the calling party is supported by the serving MSC;

including, in a routing request return result message sent from said serving MSC to said HLR/SCP, an Access Denied Parameter set to service rejected by the serving MSC, upon determining that said serving MSC does not support the type of call requested by the calling party;

determining, in said HLR/SCP, a forwarding number associated with said service type parameter;

sending, from said HLR/SCP to said O-MSC, the forwarding number associated with the service type parameter; and forwarding said incoming call to said forwarding number associated with the service type parameter.

6. The method of claim 5 further comprising, after the step of determining in said serving MSC whether the type of call requested by the calling party is supported by the serving MSC, the steps of:
  sending a paging signal to said mobile station, said paging signal including said service type parameter, upon determining that said serving MSC supports the type of call requested by the calling party;
  obtaining a page response from said mobile station, said page response including an indication that the type of call requested by the calling party is rejected by said mobile station; and
  including, in a routing request return result message sent from said serving MSC to said HLR/SCP, an Access Denied Parameter set to service rejected by the mobile station.

7. The method of claim 6 further comprising the steps of:
  receiving said paging signal in said mobile station;
  analyzing said service type parameter included in said paging signal;
  determining whether said mobile station is currently able to accept the type of call associated with said service type parameter; and
  including, in said page response, the indication that the type of call requested by the calling party is rejected, upon determining that said mobile station is currently not able to accept the type of call associated with said requested service code.

* * * * *